Patented Sept. 23, 1924.

1,509,138

UNITED STATES PATENT OFFICE.

LEOPOLD GRAFENBERG, OF COLOGNE-LINDENTHAL, GERMANY, ASSIGNOR TO JOHN FERREOL MONNOT, OF MILL HILL, MIDDLESEX, ENGLAND.

ALKALINE ELECTRIC BATTERY.

No Drawing.   Application filed May 21, 1923.   Serial No. 640,553.

*To all whom it may concern:*

Be it known that I, Dr. LEOPOLD GRAFENBERG, a citizen of the German Republic, residing at 110 Wullnerstr., Cologne-Lindenthal, Germany, have invented certain new and useful Improvements in or Relating to Alkaline Electric Batteries, of which the following is a specification.

This invention relates to alkaline electric batteries, and has special reference to the production of an active material for the negative electrodes of such batteries.

For the production of active material for the negative electrodes of alkaline electric batteries and more especially for cadmium electrodes, various processes are already known, most of which are based upon the reduction of cadmium oxides or salts by purely chemical means. Attempts have also been made to reduce cadmium electrolytically from solutions of its salts, but as a rule there are only obtained in this way products possessing but slight activity when used in an accumulator. An improvement has been effected by electrolytically precipitating iron together with the cadmium, but under these circumstances a mass is obtained the activity of which is detrimentally affected after long storage, or after warming, owing to oxidation of the iron.

According to the present invention a process for the production of an active mass for the negative electrodes, especially cadmium electrodes, of alkaline electric batteries is characterized in that the cadmium is electrolytically precipitated from solutions in which it is contained as a complex cation.

By means of the present process a cadmium of substantially greater fineness than heretofore is produced, so that a considerably stronger activity of the negative mass is obtained.

In order to obtain uniform and durable products it is preferable that the solution subjected to electrolysis should contain in addition to a complex cadmium salt such as for example cadmium ammonia sulphate a complex ammonia salt of another metal such as nickel ammonia sulphate so that the precipitation of the cadmium and the other metal present will be effected at the same time.

As an example of one method of carrying out the process the cadmium is precipitated at the cathode from its complex ammonia salt solution, complex nickel or copper or similar ammonia salts being added to the electrolyte. The quantities of other metals contained in the precipitated cadmium may vary within wide limits, in the case of nickel for example between one and twenty-five per cent or even higher. In this case use is preferably made of nickel-cadmium alloys as anodes. There can also be employed however pure cadmium anodes, in which case the nickel is added to the bath as a salt. Nickel, iron or other suitable metals can be used as cathodes and upon these, during the electrolysis, there is precipitated a very voluminous metallic sponge, which is stripped off from time to time, and, after being washed, is dried at about 100° C., whereby the cadmium is for the most part oxidized. The mass thus obtained can be pressed into the electrode pockets either at once or after being mixed together with known additions. In the presence of sufficient quantities of free ammonia there is formed at the anode a white cadmium hydrate, which can also be used as an active material either alone or mixed with the cathode sponge.

What I claim and desire to secure by Letters Patent of the United States is:—

1. A process for the manufacture of negative electrodes for alkaline electric batteries, which consists in electrolytically precipitating an active cadmium-containing mass from a solution containing at least one complex metal ammonia salt and utilizing said active mass so obtained as a filling material for said negative electrodes.

2. A process for the manufacture of negative electrodes for alkaline electric batteries which consists in electrolytically precipitating an active cadmium-containing mass from a solution of a complex cadmium ammonia salt and utilizing said active mass so obtained as a filling material for said negative electrodes.

3. A process for the manufacture of negative electrodes for alkaline electric batteries which consists in electrolytically precipitating active cadmium from a solution of cadmium ammonia sulphate and utilizing said active cadmium so obtained as a filling material for said negative electrodes.

4. A process for the manufacture of negative electrodes for alkaline electric batteries which consists in electrolytically precipitating an active mass comprising an admixture of cadmium and nickel from a solution containing a complex cadmium ammonia salt and a complex nickel ammonia salt and utilizing said active mass so obtained as a filling material for said negative electrodes.

5. A process for the production of an active cadmium-containing mass for the negative electrodes of alkaline electric batteries, which consists in subjecting to electrolysis a solution containing complex cadmium cations and complex nickel cations, the electrodes used in carrying out the said electrolysis comprising a nickel cathode and a cadmium-containing anode, whereby a metallic sponge comprising an admixture of cadmium and nickel is precipitated on the nickel cathode.

6. A process for the production of an active cadmium-containing mass for the negative electrodes of alkaline electric batteries, which consists in subjecting to electrolysis a solution containing a complex cadmium ammonia salt and a complex nickel ammonia salt, the electrodes used in carrying out the said electrolysis comprising a nickel cathode and an anode made of a nickel-cadmium alloy, whereby an admixture of cadmium and nickel is precipitated on the nickel cathode.

7. A process for the production of an active cadmium-containing mass for the negative electrodes of alkaline electric batteries, which consists in subjecting to electrolysis a solution containing complex cations of at least one metal, removing the metallic sponge thereby deposited on the cathode, washing the said sponge and thereafter drying it at a temperature in the neighborhood of 100° C., and utilizing the said sponge for filling a negative electrode for an alkaline battery.

8. A process for the production of an active mass comprising white cadmium hydrate for the negative electrodes of alkaline electric batteries which consists in subjecting to electrolysis a solution containing a complex cadmium ammonia salt together with a quantity of free ammonia, removing from the anode the white cadmium hydrate electrolytically precipitated thereon, and thereafter utilizing it for the purpose specified.

Dr. LEOPOLD GRAFENBERG.